Dec. 17, 1957  A. DI NARDO ET AL  2,816,932
PROCESS FOR PREPARING THE MONOETHERS OF PROPYLENE GLYCOL
Filed Aug. 12, 1953
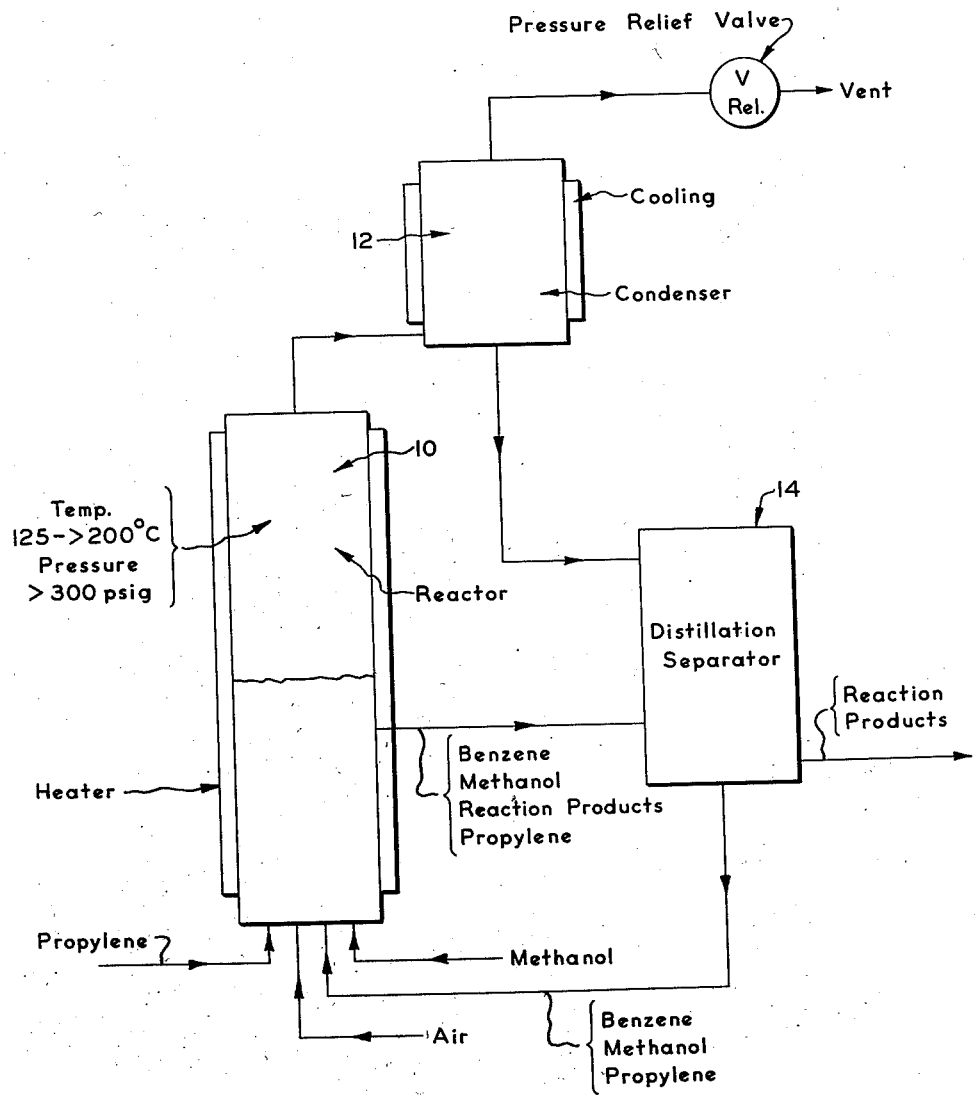
INVENTORS
Albert Di Nardo
James H. Gardner
BY  Nat C. Robertson
Oliver W. Hayes
ATTORNEY United States Patent Office 2,816,932
Patented Dec. 17, 1957

2,816,932

PROCESS FOR PREPARING THE MONOETHERS OF PROPYLENE GLYCOL

Albert Di Nardo, Jamaica Plain, James H. Gardner, Cambridge, and Nat C. Robertson, Wellesley, Mass., assignors, by mesne assignments, to Escambia Chemical Corporation, Pace, Fla., a corporation of Delaware Application August 12, 1953, Serial No. 373,728

5 Claims. (Cl. 260—615)

This invention relates to the production of chemicals and more particularly to the production of glycol ethers.

A principal object of the present invention is to produce glycol ethers.

Another object of the invention is to provide a process for the liquid phase production of glycol ethers by the direct combination of olefins, oxygen, and a hydroxyl-containing compound.

Still another object of the invention is to produce propylene glycol ethers directly from propylene, oxygen and an alcohol.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing which is a flow sheet illustrating one preferred embodiment of the invention.

In the present invention an olefin is directly converted to a glycol ether in a single reactor operated in the liquid phase and at a relatively high pressure. The present invention is practiced by dissolving an olefin in a solution of an organic hydroxyl compound with or without the addition of an inert organic solvent. The organic hydroxyl compound preferably contains at least one hydroxyl group, for example, the aliphatic alcohols methanol, ethanol, etc. An elemental-oxygen-containing gas is passed into the solution while it is held under pressure above about 300 p. s. i. g. and maintained at a temperature above about 125° C. The olefin dissolved in the solution is oxidized to the intermediate olefin oxide which reacts with the organic hydroxyl compound present to form the corresponding glycol ether which is then separated from the solution.

In the present invention an olefin, that is, an open chain unsaturated hydrocarbon having but one double bond, is converted to glycol ethers. In one preferred embodiment of the invention the olefin is a normally gaseous olefin and in one particular aspect of the invention the olefin is propylene.

The organic hydroxyl compound is an organic compound containing at least one hydroxyl group. In one preferred embodiment of the invention the organic hydroxyl compound is an aliphatic alcohol and in one particular aspect of the invention, the aliphatic alcohol is methanol.

In order to obtain a high yield of glycol ethers it is desired that the reaction be carried out under anhydrous conditions. This has the advantage of preventing excessive hydrolysis of the intermediate olefin oxide to the corresponding glycol.

The invention will be described in connection with production of the methyl ethers of propylene glycol wherein propylene is employed as the olefin and methanol is employed as the organic hydroxyl compound. This preferred embodiment of the invention is set forth in the following example, it being understood that the invention is by no means limited by this specific illustration.

Example I

An anhydrous mixture containing 800 mls. of methanol, 800 mls. of benzene (as solvent) and 1.4 grams of a manganese propionate catalyst are charged to a high pressure reactor 10. 103 grams of propylene and 25 grams of isobutane (as initiator) are now passed into the reactor 10 and the temperature thereof is raised to about 125° C. Air is fed into the reactor until the pressure reaches about 880 p. s. i. g., the temperature being raised to about 200° C. during this addition. A steady rate of air feed of about four standard cubic feet per hour is commenced. An automatic pressure relief valve vents nitrogen, oxides of carbon, and a small amount of uncondensed reactant downstream of a condenser 12 to maintain a pressure of about 800 p. s. i. g. in the reactor. Propylene is fed at varying rates roughly to replenish the consumption. 467 grams of propylene are fed in this manner during a four hour run.

After termination of the run, the reaction mixture is neutralized and fractionated to obtain 18.1 grams of propylene glycol and 21.8 grams of the methyl ethers of propylene glycol in addition to other valuable organic chemicals. The yields as grams of product per 100 grams of hydrocarbon consumed are 21.4 grams of propylene glycol and 25.7 grams of the methyl ethers of propylene glycol.

Example II 1500 mls. of methanol, 102 mls. of a phosphate buffer soluition of about pH 6, and 1.4 grams of manganese propionate catalyst are charged to a high pressure reactor 10. 10.5 grams of propylene are passed into the reactor 10 and the temperature thereof is raised to about 125° C. Air is fed into the reactor until the pressure reaches about 670 p. s. i. g., the temperature being raised to about 205° C. during this addition. A steady rate of air feed of about 4 standard cubic feet per hour is commenced. An automatic pressure relief valve vents nitrogen, oxides of carbon and a small amount of uncondensed reactant downstream of a condenser 12 to maintain a pressure of about 675 p. s. i. g. in the reactor. Propylene is fed at varying rates to replenish the consumption. 327 grams of propylene are fed in this manner during a four hour run.

After termination of the run, the reaction mixture is neutralized and fractionated to obtain 13.3 grams of propylene glycol and 8.7 grams of the methyl ethers of propylene glycol in addition to other valuable organic chemicals. The yields as grams of product per 100 grams of hydrocarbon consumed are 26.6 grams of propylene glycol and 17.4 grams of the methyl ether of propylene glycol.

In Example I the reaction was carried out under substantially anhydrous conditions. While not essential to the operation of the process, this aspect of the invention has been found to greatly increase the amount of glycol ethers formed per hundred grams of olefin consumed, as can be seen from a comparison of Example I with Example II. This is probably due to the fact that excessive hydrolysis of the olefin oxide is eliminated.

The formation of the glycol ethers is believed to be the result of a two-stage reaction. It is thought that the olefin is first oxidized to the corresponding oxide which in turn reacts with the organic hydroxyl compound to produce the corresponding glycol ethers. This reaction can be illustrated by the following equations as applied to the oxidation of propylene in the presence of methanol to form monomethyl ethers of propylene glycol:

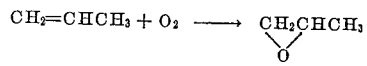

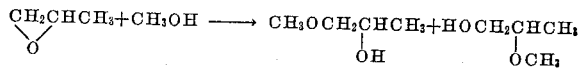

When the process is operated on a continuous basis, the condenser 12 continuously refluxes propylene, benzene, methanol and some oxygenated products to a distillation separation apparatus 14 (which may include several conventional stills). Some of the liquid in the reactor 10 is also fed to the distillation apparatus 14 so as to provide for continuous removal of the various reaction products. The various reaction products are separated from the benzene solvent, methanol and propylene which are recycled back to the bottom of the reactor 10.

While one specific example of the present invention has been given above, it is subject to wide variations without departing from the scope thereof. For example, glycol ethers other than those of propylene may be obtained by employing other olefins such as ethylene, the butylenes, the amylenes, the heptylenes, the hexylenes, the octylenes, etc. Also ethers other than methyl may be obtained by employing other organic hydroxyl compounds such as the saturated aliphatic alcohols; ethanol, the propanols, the butanols, the pentanols, etc., or cyclic compounds such as phenol, benzyl alcohol, the cresols, phenyl ethyl alcohol, etc.

In Example I benzene was employed as an inert solvent. Other inert organic solvents which can accommodate high concentrations of the olefin and which are more or less substantially miscible with the organic hydroxyl compound can be utilized in place of benzene. In this connection it should be pointed out that the inert solvent may be eliminated and the organic hydroxyl compound may serve as the solvent for the olefin as was illustrated in Example II. The manganese propionate catalyst is a well-known oxidation catalyst. Other manganous salts or salts or oxides of metals of variable valence are equally effective. An important purpose of utilizing an oxidation catalyst is to prevent the creation of large concentrations of dangerously explosive hydroperoxides. It is believed that the metal walls of the reaction chamber may have sufficient catalytic effect to prevent the formation of such hydroperoxides.

The range of operating pressures and operating temperatures is quite broad and can be varied within considerable limits. With regard to pressure it should be pointed out that it is preferably maintained above 300 p. s. i. g. but that considerably higher pressures may be utilized where design considerations indicate the desirability of such higher pressures. The temperature within the reactor may be varied between about 125° C. and 200° C. or higher. The upper temperature limitation is controlled by the critical temperature of the solvent (e. g., benzene or the organic hydroxyl compound) employed.

Since certain changes may be made in the above process without departing from the scope of the invention herein involved, it is intended that all matter contained in the above description, or shown in the accompanying drawing, shall be interpreted as illustrative and not in a limiting sense.

What is claimed is:

1. The method of forming propylene glycol ethers directly from propylene which comprises dissolving propylene in an aliphatic alcohol containing between one and five carbon atoms, said aliphatic alcohol being present in excess of the stoichiometric amount required to form glycol ethers, passing an elemental-oxygen-containing gas into said solution while holding said solution under sufficient pressure to maintain it in the liquid phase, maintaining said solution at a temperature between about 125° C. and the critical temperature of said aliphatic alcohol while said gas passes therethrough, and separating monoethers of propylene glycol from said solution.

2. The method of claim 1 wherein the aliphatic alcohol is methanol and the glycol ethers separated are the monomethyl ethers of propylene glycol.

3. The method of forming propylene glycol ethers directly from propylene which comprises forming a solution comprising an inert organic solvent, propylene and an aliphatic alcohol containing between one and five carbon atoms, said aliphatic alcohol being present in excess of the stoichiometric amount required to form glycol ethers, passing an elemental-oxygen-containing gas into said solution while said solution is held under sufficient pressure to maintain liquid phase conditions, maintaining said solution at a temperature between about 125° C. and the critical temperature of said inert organic solvent while said gas passes therethrough, and separating monoethers of propylene glycol from said solution.

4. The method of claim 3 wherein the inert organic solvent is benzene.

5. The method of forming monomethyl ethers of propylene glycol directly from propylene which comprises forming a solution comprising benzene, propylene and methanol, said methanol being present in excess of the stoichiometric amount required to form glycol ethers, passing an elemental-oxygen-containing gas into said solution while said solution is held under a pressure above about 300 p. s. i., maintaining said solution at a temperature between about 125° C. and the critical temperature of said benzene while said gas passes therethrough, and separating monomethyl ethers of propylene glycol from said solution.

References Cited in the file of this patent

UNITED STATES PATENTS

| | | |
|---|---|---|
| 1,730,061 | Davidson | Oct. 1, 1929 |
| 2,366,724 | Gardner | Jan. 9, 1945 |
| 2,644,837 | Schweitzer | July 7, 1953 |
| 2,650,927 | Gasson et al. | Sept. 1, 1953 |